United States Patent
Gross (10) Patent No.: US 12,264,782 B2
(45) Date of Patent: Apr. 1, 2025

(54) HYDROGEN CRYOGENIC NON CIRCULAR DORSAL TANK

(71) Applicant: Airbus Operations GmbH, Hamburg (DE)

(72) Inventor: Claus-Peter Gross, Hamburg (DE)

(73) Assignee: AIRBUS OPERATIONS GMBH, Hamburg (DE)

(*) Notice: Subject to any disclaimer, the term of this patent is extended or adjusted under 35 U.S.C. 154(b) by 79 days.

(21) Appl. No.: 18/075,308

(22) Filed: Dec. 5, 2022

(65) Prior Publication Data
US 2023/0184382 A1 Jun. 15, 2023

(30) Foreign Application Priority Data
Dec. 10, 2021 (EP) .................................. 21213828

(51) Int. Cl.
*F17C 3/00* (2006.01)
*B64D 37/04* (2006.01)
*B64D 37/30* (2006.01)

(52) U.S. Cl.
CPC ............... *F17C 3/00* (2013.01); *B64D 37/04* (2013.01); *B64D 37/30* (2013.01); *F17C 2201/0147* (2013.01); *F17C 2203/012* (2013.01); *F17C 2221/012* (2013.01); *F17C 2223/0161* (2013.01); *F17C 2223/033* (2013.01); *F17C 2270/0189* (2013.01)

(58) Field of Classification Search
CPC . B64D 37/04; B64D 37/30; F17C 2270/0189; F17C 2223/033; F17C 2223/0161; F17C 2221/012; F17C 2203/012; F17C 2201/0147; F17C 3/00

USPC ............ 244/135 R, 172.3; 220/560.11, 4.14, 220/4.15, 905
See application file for complete search history.

(56) References Cited

U.S. PATENT DOCUMENTS

| | | | | |
|---|---|---|---|---|
| 2,777,656 A * | 1/1957 | Clifton | ................... | B64D 37/04 244/118.3 |
| 3,645,415 A * | 2/1972 | Phelps | ................... | B65D 88/02 220/553 |
| 3,979,005 A * | 9/1976 | Robinson | ............... | B64D 37/06 220/560.07 |
| 4,026,503 A * | 5/1977 | Rhodes | ................... | B64D 37/04 220/666 |
| 4,611,724 A * | 9/1986 | Watkins | ................. | B65D 90/52 220/563 |

(Continued)

FOREIGN PATENT DOCUMENTS

| | | |
|---|---|---|
| DE | 102014107316 A1 | 11/2015 |
| GB | 2591253 A | 7/2021 |

(Continued)

OTHER PUBLICATIONS

European Search Report dated Apr. 27, 2022; priority document.

*Primary Examiner* — Chun Hoi Cheung
(74) *Attorney, Agent, or Firm* — Greer, Burns & Crain, Ltd.

(57) ABSTRACT

In order to enlarge a tank volume of a hydrogen powered aircraft, an aircraft tank for storing cryogenic $H_2$ is configured as a non-circular dorsal tank. The aircraft tank may be configured as a conformal fuel tank fitted to an outer contour of an aircraft fuselage. Further, an aircraft is provided with such an aircraft tank.

13 Claims, 9 Drawing Sheets

(56) References Cited

U.S. PATENT DOCUMENTS

| | | | | |
|---|---|---|---|---|
| 4,913,380 A * | 4/1990 | Vardaman | ............... | B64D 37/04 60/734 |
| 5,779,092 A * | 7/1998 | Hehn | ..................... | B65D 90/52 137/574 |
| 5,782,427 A * | 7/1998 | Hermach | ............... | B64D 27/08 244/135 R |
| 5,845,879 A * | 12/1998 | Jensen | ................... | B64D 37/04 244/135 R |
| 5,975,466 A * | 11/1999 | Kahara | ................. | B64D 37/02 244/135 R |
| 6,595,382 B2 * | 7/2003 | Ettlinger | ................... | F17C 1/08 220/560.11 |
| 7,624,946 B2 * | 12/2009 | Schoene | ................... | F17C 1/00 244/172.3 |
| 8,172,181 B2 * | 5/2012 | Burgess | ................ | B64D 37/04 244/119 |
| 2005/0230554 A1 | 10/2005 | Schoene | | |
| 2012/0175463 A1 * | 7/2012 | Burgess | ............... | B64C 1/0009 244/130 |
| 2014/0117163 A1 * | 5/2014 | Simpson | ............... | B64D 37/30 244/135 R |
| 2015/0336680 A1 | 11/2015 | Schumacher et al. | | |

FOREIGN PATENT DOCUMENTS

| | | |
|---|---|---|
| GB | 2591255 A | 7/2021 |
| RU | 2614443 C1 | 3/2017 |

\* cited by examiner

HYDROGEN CRYOGENIC NON CIRCULAR DORSAL TANK

CROSS-REFERENCES TO RELATED APPLICATIONS

This application claims the benefit of the European patent application No. 21213828.3 filed on Dec. 10, 2021, the entire disclosures of which are incorporated herein by way of reference.

FIELD OF THE INVENTION

The invention relates to an aircraft tank for a hydrogen-powered aircraft and to an aircraft provided with such an aircraft tank.

BACKGROUND OF THE INVENTION

One possibility to provide a zero-emission aircraft is to power the aircraft with hydrogen. Compared to kerosene, hydrogen requires approximately four times more tank volume.

SUMMARY OF THE INVENTION

The object of the invention is to provide an aircraft tank providing more tank volume for storing cryogenic hydrogen.

The invention provides an aircraft tank for storing cryogenic hydrogen ($H_2$), wherein the aircraft tank is configured as non-circular dorsal tank.

Preferably, the aircraft tank is configured as conformal fuel tank fitted to an outer contour of an aircraft fuselage.

Preferably, at least one outer or inner skin segment of the tank has a cross section formed as a circular segment or elliptical segment.

Preferably, first and second outer and/or inner skin segments are connected with a transition area having a stronger curvature compared to the curvature of the first and second skin segments.

Preferably, a lower side of the tank to be arranged near to the aircraft fuselage has several skin segments connected by concave connection areas.

Preferably, a lower side to be arranged near to an aircraft cabin has first to third skin segments with a convex curvature with concave connection areas therebetween.

Preferably, the aircraft tank includes a series of reinforcement ribs connecting several skin segments of the tank in the interior of the tank.

Preferably, the ribs have perforations enabling cryogenic $H_2$ flow.

Preferably, the ribs have several orifices for weight reduction.

Preferably, the aircraft tank comprises an inner skin side reinforced with at least one of the reinforcement structures of the group consisting of flanges, stringers, orthogrid stiffeners, and isogrid stiffeners.

Preferably, the aircraft tank comprises a flat or plate shaped bulkhead for closing a forward and/or backward end of the tank.

Preferably, the aircraft tank comprises a closure bulkhead with at least one reinforcement structure.

Preferably, the aircraft tank comprises a closure bulkhead reinforced with at least one of the reinforcement structures of the group consisting of longitudinal stiffeners, transversal stiffeners, orthogrid stiffeners, and isogrid stiffeners.

Preferably, the aircraft tank comprises a bird-strike resistant forward closure bulkhead.

Preferably, the aircraft tank comprises an inner skin defining an inner tank volume and an outer secondary skin enclosing the inner skin and defining an isolation chamber between the inner and outer skins.

Preferably, a distance between the inner and outer skins is at least 40 mm.

Preferably, the outer skin has an aerodynamic smooth outer surface and/or a fairing function.

Preferably, the aircraft tank has an elongated tank body with a non-circular cross section. Preferably, a tank wall assembly of the tank body comprises at least one inner skin and at least one outer skin.

According to another aspect, the invention provides an aircraft, especially passenger or cargo aircraft, comprising an aircraft tank according to any of the preceding embodiments.

Preferably, the aircraft is a single-aisle or double aisle aircraft.

Preferably, the aircraft has a fuselage containing a passenger cabin and/or a cargo space, wherein the non-circular $H_2$ cryogenic dorsal tank is arranged on the top of the fuselage.

Preferably, the aircraft tank is configured as conformal tank of the aircraft.

Preferably, the outer skin of the aircraft tank has aerodynamical smooth transitions to the outer skin of the fuselage.

One possible concept for a zero-emission aircraft is to power the engines of a turbofan aircraft with hydrogen. With this concept, classical aircraft configurations can be used wherein fuel tanks are configured to store hydrogen. The most promising storage concept for hydrogen is the cryogenic storage of liquid hydrogen at low temperatures. At the present, cryogenic $H_2$ tanks are normally cylindrical tanks or spherical tanks with a circular cross section. This has advantages with regard to a small surface enclosing a large volume, and correspondingly low weight of the tank, better thermal isolation and better handling of higher pressures within the tank.

Preferably, the aircraft is a turbofan hydrogen-powered aircraft. Due to the powering with hydrogen, the aircraft produces zero CO2 emissions and can substantially reduce air pollutants such as nitrogen oxide, as well as helping prevent contrail formation. However, a larger tank volume is needed for storing $H_2$ compared with kerosene.

In current classical passenger and cargo airplanes, tanks inside the wing do not provide volume which suits all needs of a hydrogen-powered aircraft. Therefore, embodiments of the invention provide, as (additional) tank position option, the dorsal tank configuration.

Previous and current studies show that for a classic aircraft configuration the dorsal tank configuration is a good option. Some challenges with these configurations are:

Large dorsal tank fairings and therefore increased wetted area and dorsal fairing weight
reduced VTP efficiency (side wash effect)—VTP has to be increased (weight increase).

Therefore, preferred embodiments of the invention propose a non-circular tank; especially, a non-circular tank which follows the shape of the fuselage. One target of some embodiments is to make best use of the available cross-sectional area between dorsal tank and fuselage, avoiding unused space.

By a circular tank, which is common for actual concepts of cryogenic H$_2$ aircraft tanks, this unused area would need to be covered by the fairing, increasing the fairing area and weight significantly.

Preferred embodiments of the invention provide at least one or several of the following advantages:
  Reduced wetted area and therefore reduced fairing weight and drag
  Weight impact by non-circular tank is mitigated by reduced fairing weight
  Tank outer skin replaces fairing
  Low impact on VTP efficiency as side wash effect is low
  Block fuel reduction by improved aerodynamic and overall weight neutral concept Preferred embodiments of the invention propose a non-circular cryogenic H$_2$ aircraft dorsal tank. Preferably, the tank follows the shape of the fuselage and reduces the fairing wetted area. Most preferred embodiments aim to make best use of the available cross-sectional area between dorsal tank and fuselage, avoiding unused space.

Preferred embodiments provide a dorsal tank arrangement comprising several non-circular H$_2$ tanks.

Preferably, the H$_2$ tank or all H$_2$ tanks are filled with liquid hydrogen and dimensioned for a maximum pressure of 5 bar.

Preferably, the selected tank material is light metal such as an aluminum alloy, especially aluminum AL 2219. Composites may be an option. According to several embodiments, some of the areas of the tank wall or of skin segments thereof may be made from metal while other areas may be made from composite material. According to further embodiments, skins of the tank can be made, at least partially from fiber reinforced plastics such as CFRP.

Preferably, vacuum is assumed in between tank skin and outer aerodynamic tank skin for best isolation.

Preferably, the temperature inside tank is <20.27 K (−252.88° C.).

Preferred embodiments provide a non-circular dorsal tank.

Preferably, the tank follows outer contour of the fuselage.
Preferably, the tank has circular outer skin segments.
Preferably, the tank has ribs inside.
Preferably, the tank has perforated ribs inside to enable cryogenic H$_2$ flow.
Preferably, the tank has ribs including weight reduction orifices.
Preferably, the tank inner skin side is reinforced with flanges/stringers, orthogrid or isogrid stiffeners.
Preferably, the tank has a flat reinforced closure bulkhead, especially reinforced e.g., by longitudinal, orthogrid or isogrid stiffeners.
Preferably, the tank has a bird-strike resistant forward closure bulkhead.
Preferably, the tank has a secondary outer skin with a distance of 40 mm from tank skin providing an isolation chamber.
Preferably, the tank has a secondary outer skin with a distance of minimum 40 mm from tank skin providing the aerodynamic smoothness (no need of a fairing around the tank).

BRIEF DESCRIPTION OF THE DRAWINGS

Embodiments of the invention are described in more detail with reference to the accompanying drawings in which.

DETAILED DESCRIPTION OF THE PREFERRED EMBODIMENTS

Figure 1:
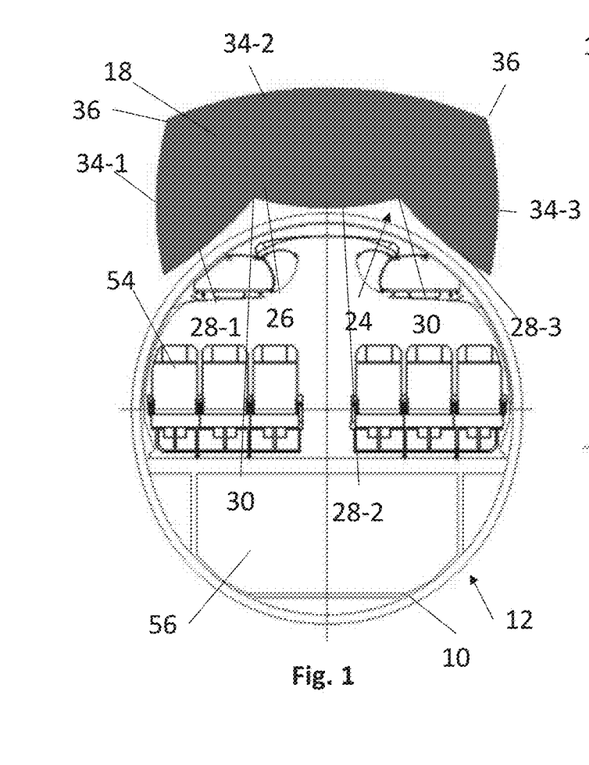
FIG. 1 shows a schematical cross section showing a first embodiment of an aircraft according to the invention equipped with an aircraft tank according to a first embodiment of the invention.
Figure 2:
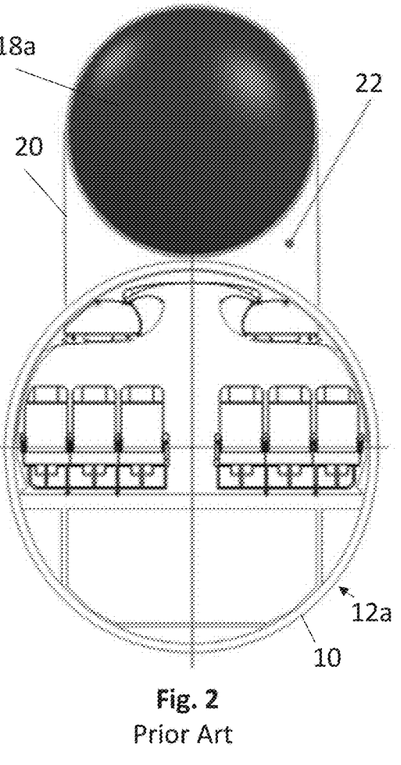
FIG. 2 shows a view similar to FIG. 1 of an aircraft according to a first comparative example with an aircraft tank according to a comparative example.
Figure 3:
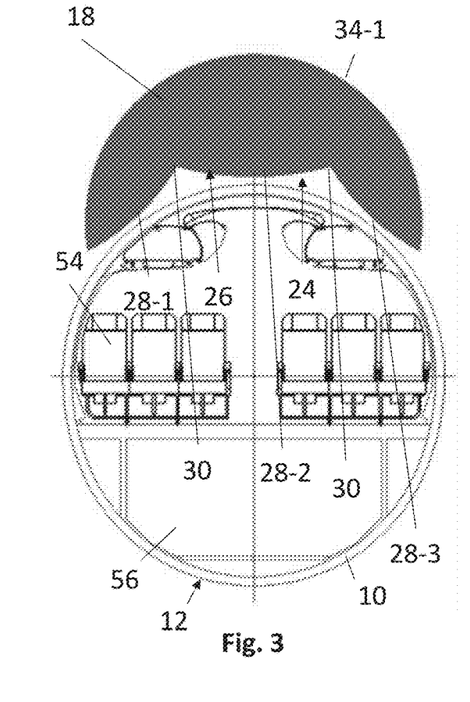
FIG. 3 shows a cross section as in FIG. 1 of an aircraft according to a second embodiment of the invention with an aircraft tank according to the second embodiment of the invention.
Figure 4:
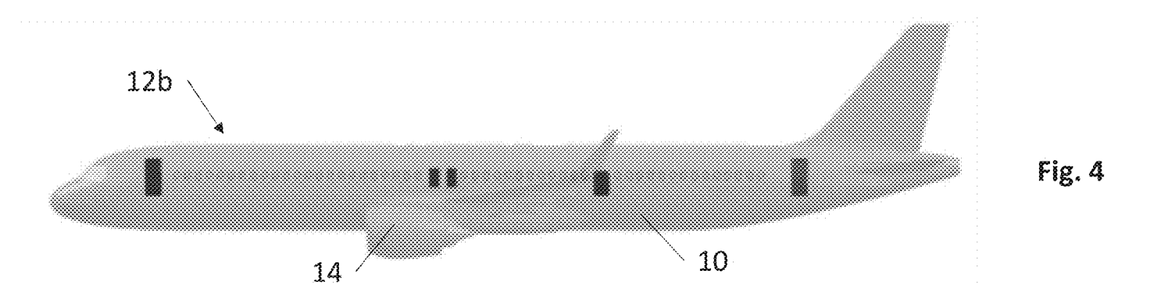
FIG. 4 shows a side view of a conventional aircraft as a second comparative example.
Figure 5:
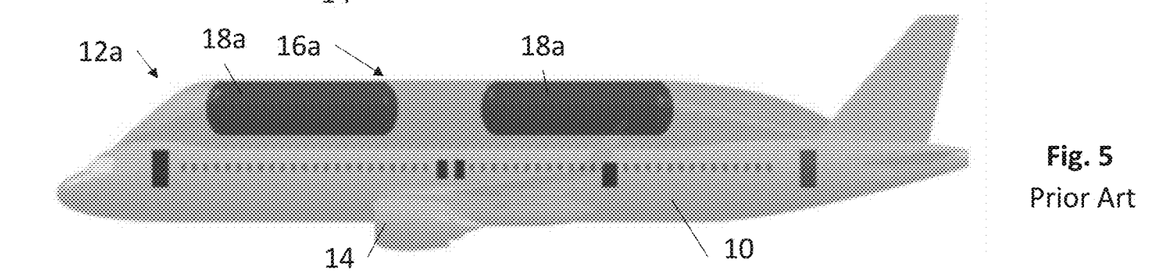
FIG. 5 shows a side view of the aircraft according to the first comparative example, which is shown in cross section in FIG. 2, with an aircraft tank according to this first comparative example.
Figure 6:
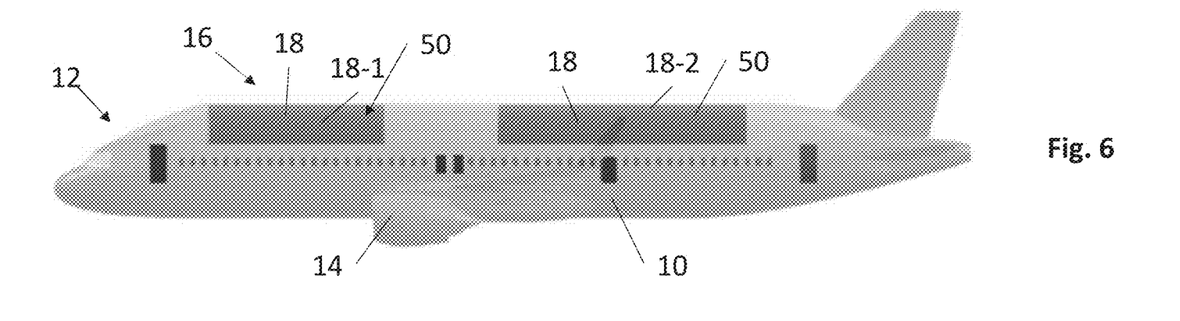
FIG. 6 shows a side view of an aircraft according to the first embodiment of the invention, a cross section thereof is also shown in FIG. 1; with an aircraft tank according to the first embodiment of the invention.
Figure 7:
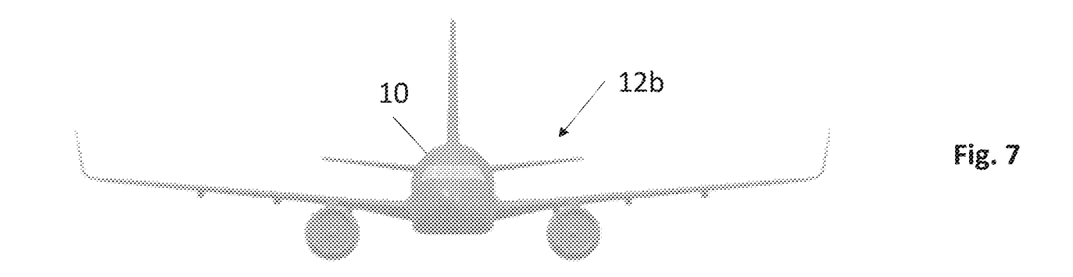
FIG. 7 shows a front view of the aircraft according to the second comparative example of FIG. 4.
Figure 8:
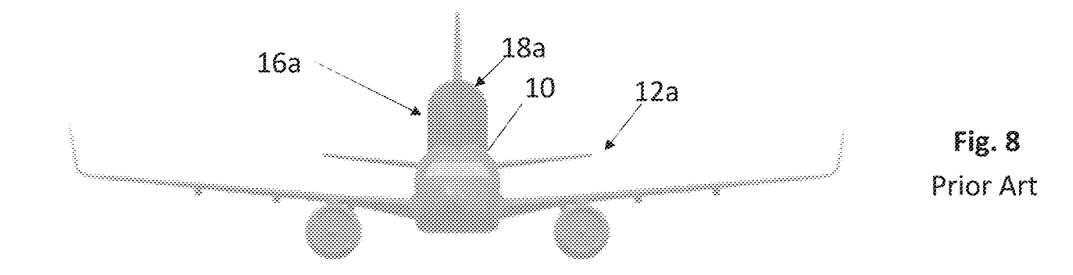
FIG. 8 shows a front view of the aircraft according to the first comparative example of FIG. 5.
Figure 9:
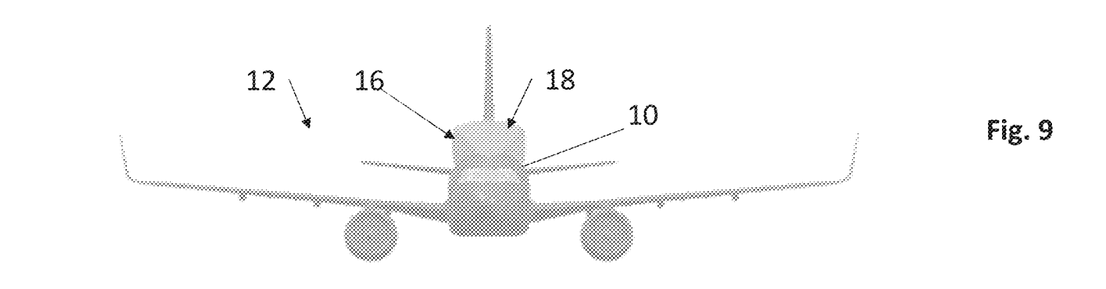
FIG. 9 shows a front view of the aircraft according to the first embodiment of the invention as also shown in FIG. 6.

FIGS. 1 and 3 show cross sections through a fuselage 10 of an aircraft 12 according to a first and second embodiment of the invention, while FIG. 2 shows a similar cross section through the aircraft 12a according to a first comparative example. FIGS. 4 and 7 show different views of a further aircraft 12b according to a second comparative example, while FIGS. 5 and 8 show similar views of the aircraft 12a according to the first comparative example, and FIGS. 6 and 9 show similar views of the aircraft 12 according to the first embodiment of the invention, a cross section thereof is also shown in FIG. 1.

FIGS. 4 and 7 show a conventional aircraft 12b (second comparative example) with turbofans 14 as engines powered by kerosine. The kerosine is stored in aircraft tanks within the wings. FIGS. 2, 5 and 8 show an aircraft 12a according to the first comparative example having turbofans 14 as engines which are powered by hydrogen. In order to provide a larger tank volume compared to the kerosine tanks of the conventional aircraft of FIGS. 4 and 7, the aircraft 12a according to the first comparative example comprises a dorsal tank arrangement 16a including several cylindrical aircraft tanks 18a which are configured to store cryogenic hydrogen. These cylindrical hydrogen aircraft tanks 18a according to the first comparative example are also referred to as reference tanks in the following. The aircraft 12a according to the first comparative example has, as visible in FIG. 2, a fairing 20 with a supporting substructure for the cylindrical aircraft tank 18a. Hence, a large unused space 22 is present.

The aircraft 12 according to the first and second embodiments of the invention as shown in FIGS. 1, 3, 6 and 9 have a dorsal tank arrangement 16 with several aircraft tanks 18 according to a first and second embodiment of the invention. In the embodiments shown, the dorsal tank arrangement 16 includes a forward first aircraft tank 18-1 and a rear second aircraft tank 18-2.

The aircraft tanks 18, 18-1, 18-2 are configured to store cryogenic hydrogen and have an elongated tank body with non-circular cross section as shown in larger detail in FIGS. 1 and 3. Especially, the aircraft tanks 18, 18-1, 18-2 are configured as non-circular dorsal tanks. As visible from FIGS. 1 and 3, the aircraft tanks 18, 18-1, 18-2 are conformal fuel tanks fitted to an outer contour of the fuselage 10.

The aircraft tank 18 has a lower side 24 with a recess 26 which receives the top of the fuselage 10. The lower side 24 comprises first to third (lower) skin segments 28-1, 28-2, 28-3 that are curved outwardly—convex curvature—connected by concavely curved connection areas 30 there between.

The upper part of the inner skin 32 of the aircraft tank 18 may be circular or elliptical in cross section as shown in FIG. 3 or may comprise several convexly curved (upper) skin segments 34-1, 34-2, 34-3. The curvature of this fourth to sixth skin segments 34-1, 34-2, 34-3 may be circular or elliptical, as shown in FIG. 1. Transitions areas 36 between the upper skin segments 34-1, 34-2, 34-3 have a stronger curvature compared to the curvature of the upper skin segments 34-1, 34-2, 34-3.

As visible from FIGS. 1 and 3, the non-circular cryogenic $H_2$ aircraft tank 18 makes best use of the cross-sectional area avoiding large fairings 20 and an unused space 22.

As visible by a comparison of FIG. 4 to FIG. 6 and FIG. 7 to FIG. 9 the wetted area of the aircraft tank 18 according to the embodiments of the inventions is significantly reduced compared to the reference tank 18a of the aircraft 12a of the first comparative example. The non-cylindrical aircraft tank 18 has a reduced wetted area with improved aerodynamics and reduced fairing weight.

FIG. 10 to FIG. 14 show details of the structural concept of the inner skin 32 of the aircraft tank 18. The inner skin 32 defines a tank volume 33 in its interior. The inner skin 32 is a reinforced tank skin. Especially, the inner skin 32 is reinforced by longitudinal stiffeners 38. As shown, all skin segments 28-1, 28-2, 28-3, 34-1, 34-2, 34-3 comprise the longitudinal stiffeners 38 in the interior thereof (especially at the inner side of the inner skin 32). According to other embodiments, the skin segments 28-2, 28-3, 34-1, 34-2, 34-3 could also be reinforced by orthogrid or isogrid structures (not shown).

Figure 10:
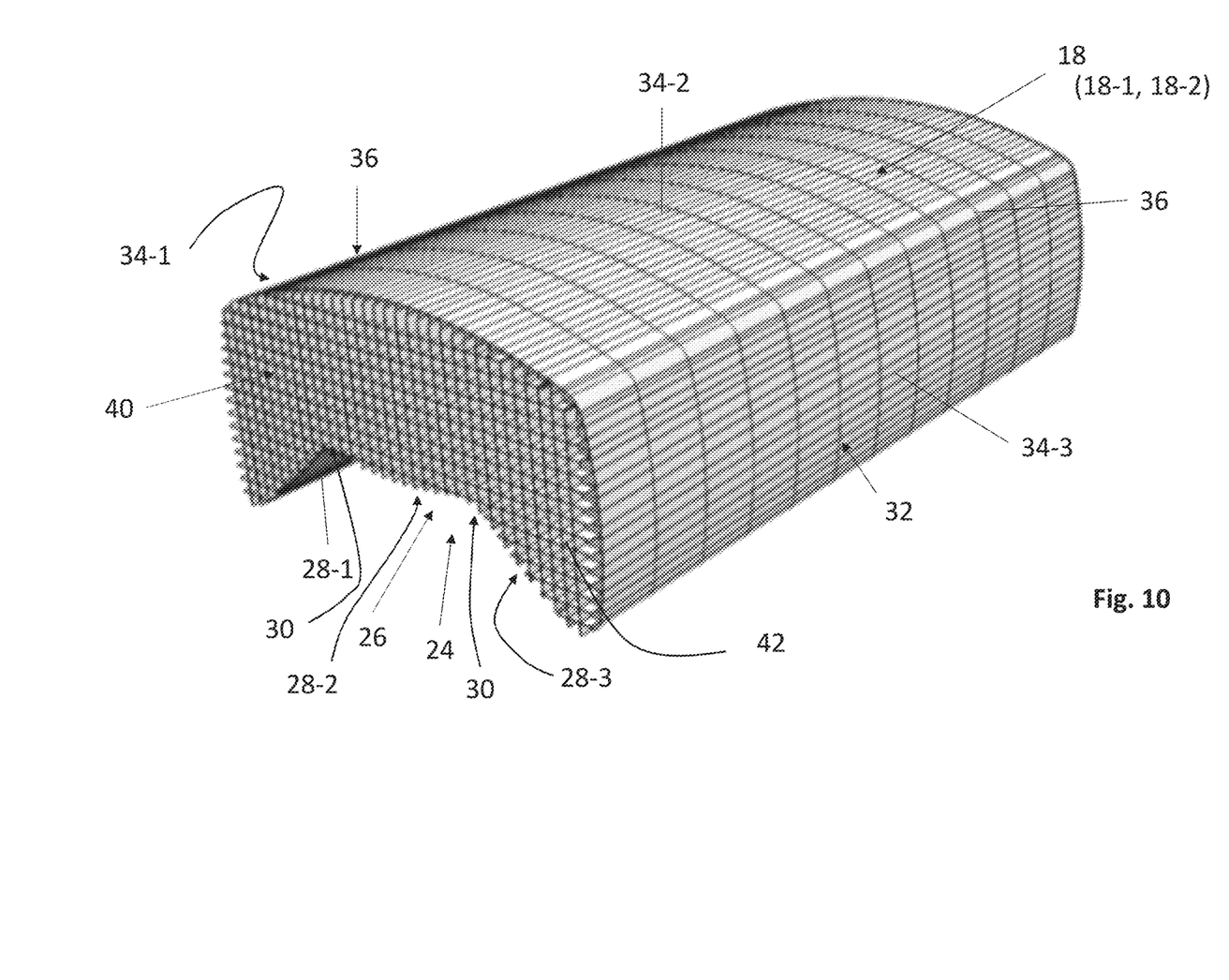
FIG. 10 shows a perspective view of an aircraft tank according to the first embodiment of the invention, wherein only an inner skin thereof is shown while an outer skin thereof is omitted.
Figure 13:
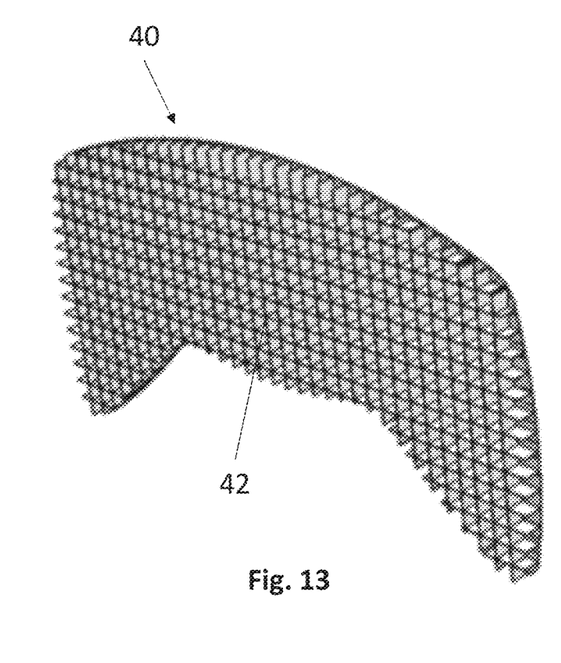
FIG. 13 shows a perspective view of a forward bulkhead of the aircraft tank of FIG. 10.

Referring to FIG. 10, the forward and rear ends of the aircraft tank 18 are closed by closure bulkheads 40; an example thereof is also shown in FIG. 13. The closure bulkhead 40 can be a flat, plate-like structure with reinforcements. The bulkhead 40 has an orthogrid structure 42 for reinforcement. The closure bulkhead 40 closes the tank 18, wherein stresses at the orthogrid structure 42 are below the allowable material stress. Especially, the forward closure bulkhead 40 is reinforced in such way that it is resistant against bird strikes.

Figure 11:
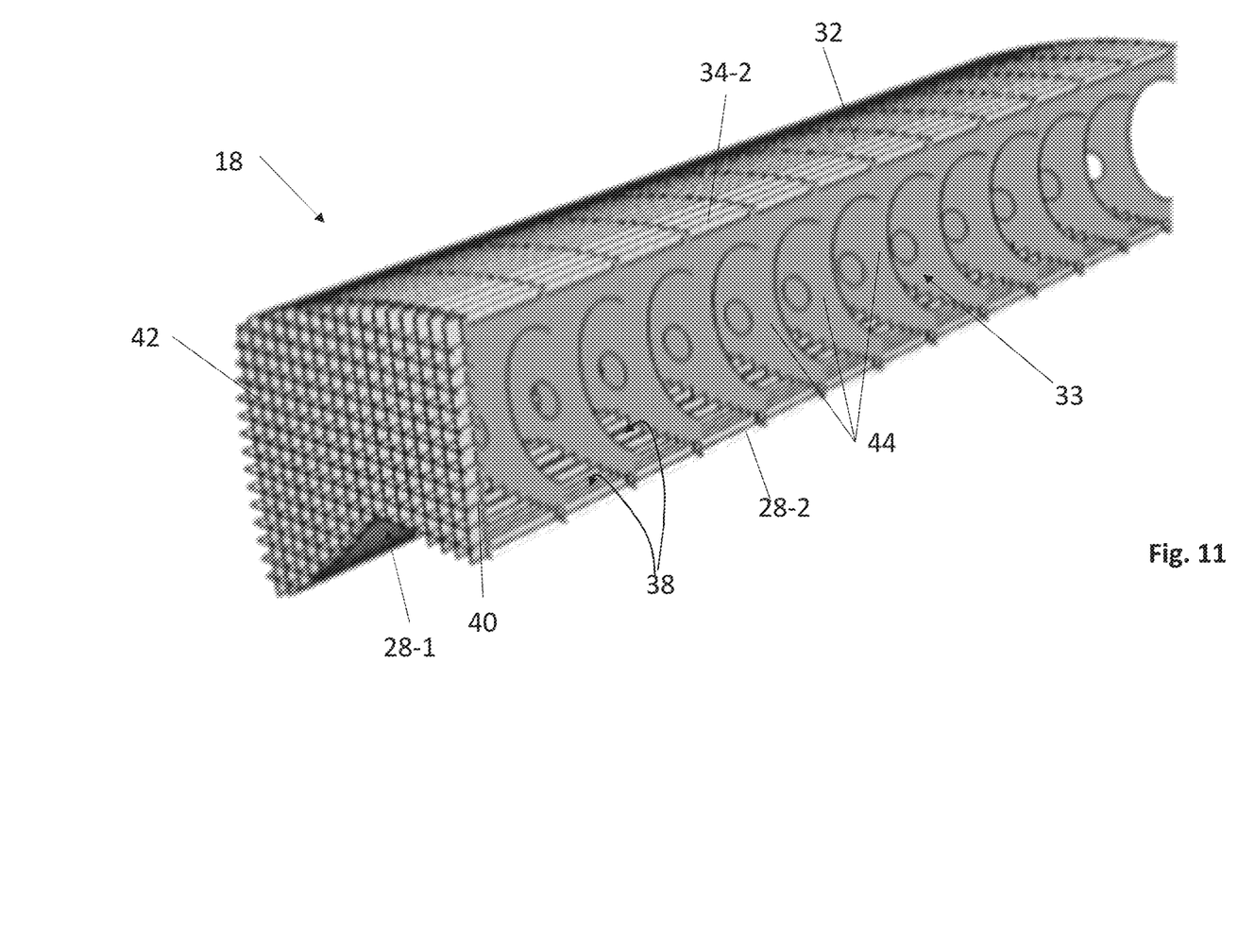
FIG. 11 shows a view similar to FIG. 10 wherein one half is cut away.
Figure 12:
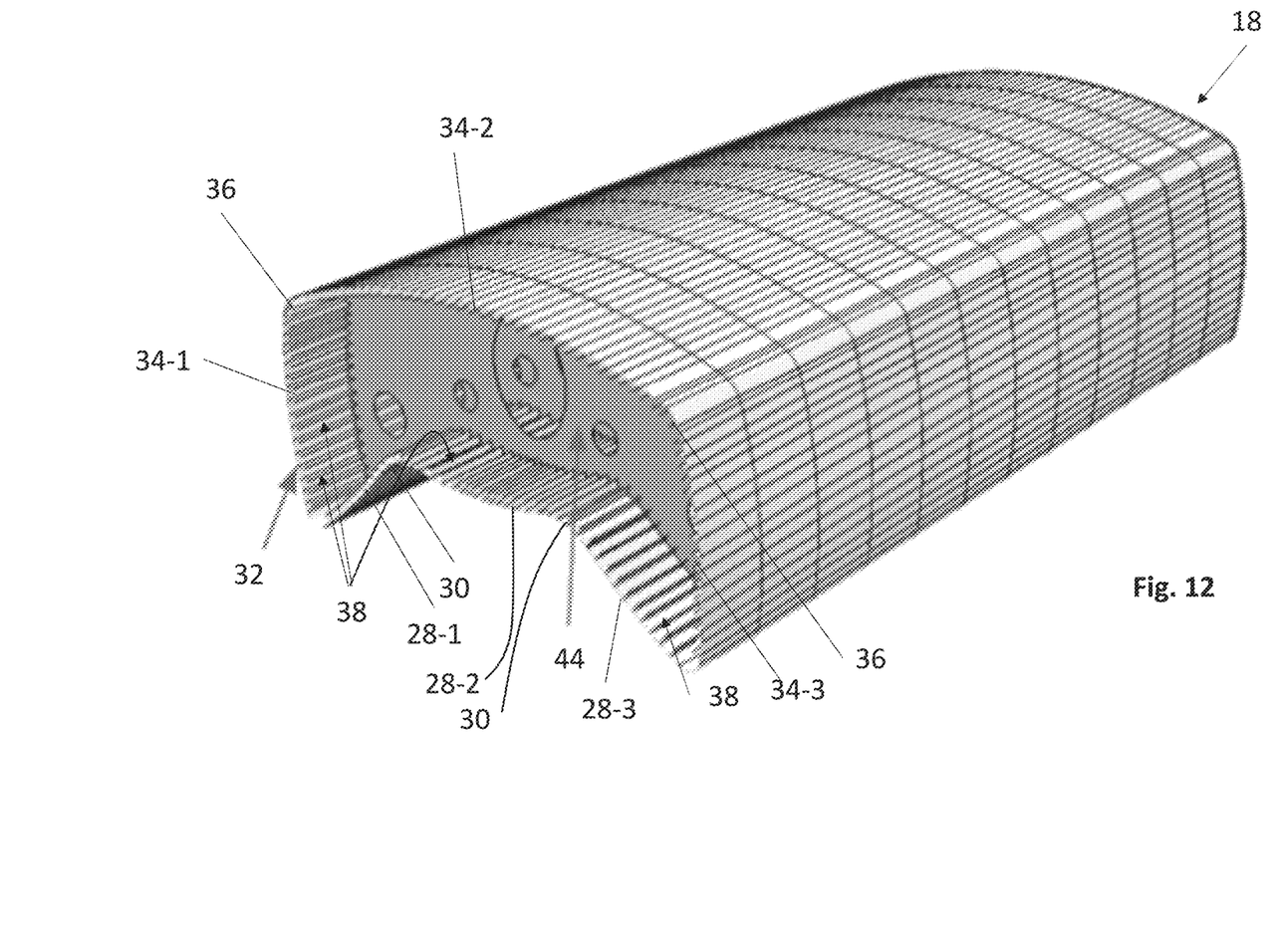
FIG. 12 shows a view similar to FIG. 10, wherein a forward end is cut away.
Figure 14:
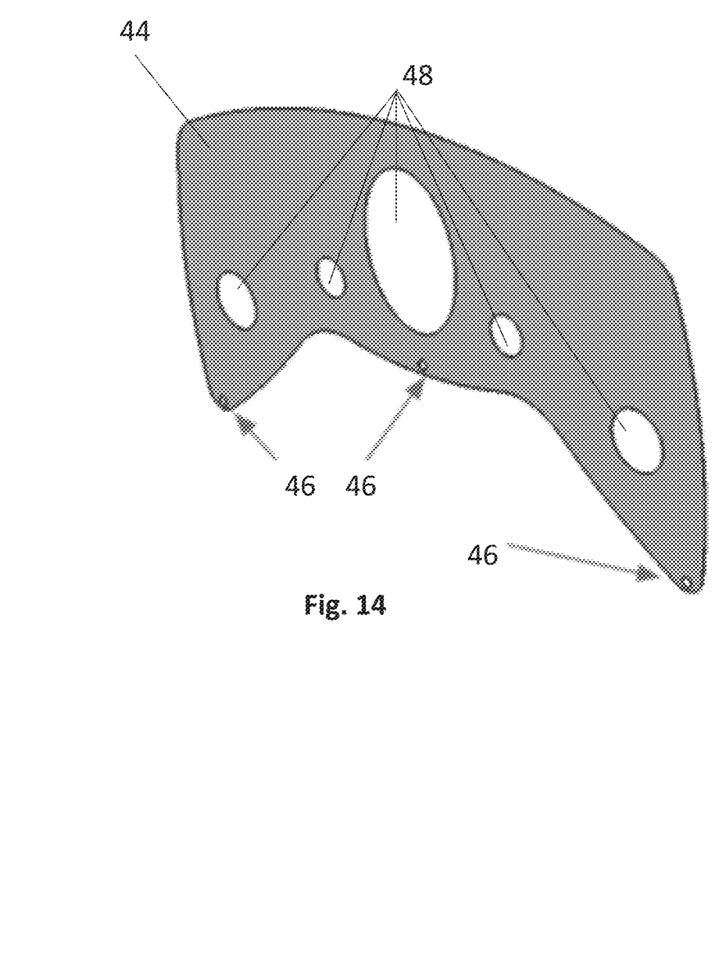
FIG. 14 shows a perspective view of one of the ribs contained in the interior of the aircraft tank as shown in FIG. 11 and FIG. 12.

As visible in FIGS. 11, 12 and 14, the interior of the aircraft tank 18 is provided with a series of reinforcement ribs 44. The ribs 44 connect the skin segments 28-1, 28-2, 28-3, 34-1, 34-2, 34-3 to each other. The ribs 44 are preferably plate-shaped structures. The ribs 44 inside have mainly the functions to keep the outer shape and minimize deformation and keep the skin stress below the allowable material stress. Preferably, the ribs 44 are evenly distributed over the longitudinal direction within the interior of the aircraft tank 18. Preferably, the ribs 44 have orifices 46 at lowest points to enable a flow of (liquid) hydrogen. Further, the ribs 44 have several larger openings 48 in order to reduce their weight. For example, a number of three to forty ribs 44 are provided within the interior tank. Preferably, the distance between the ribs 44 is less than one meter.

Figure 15:
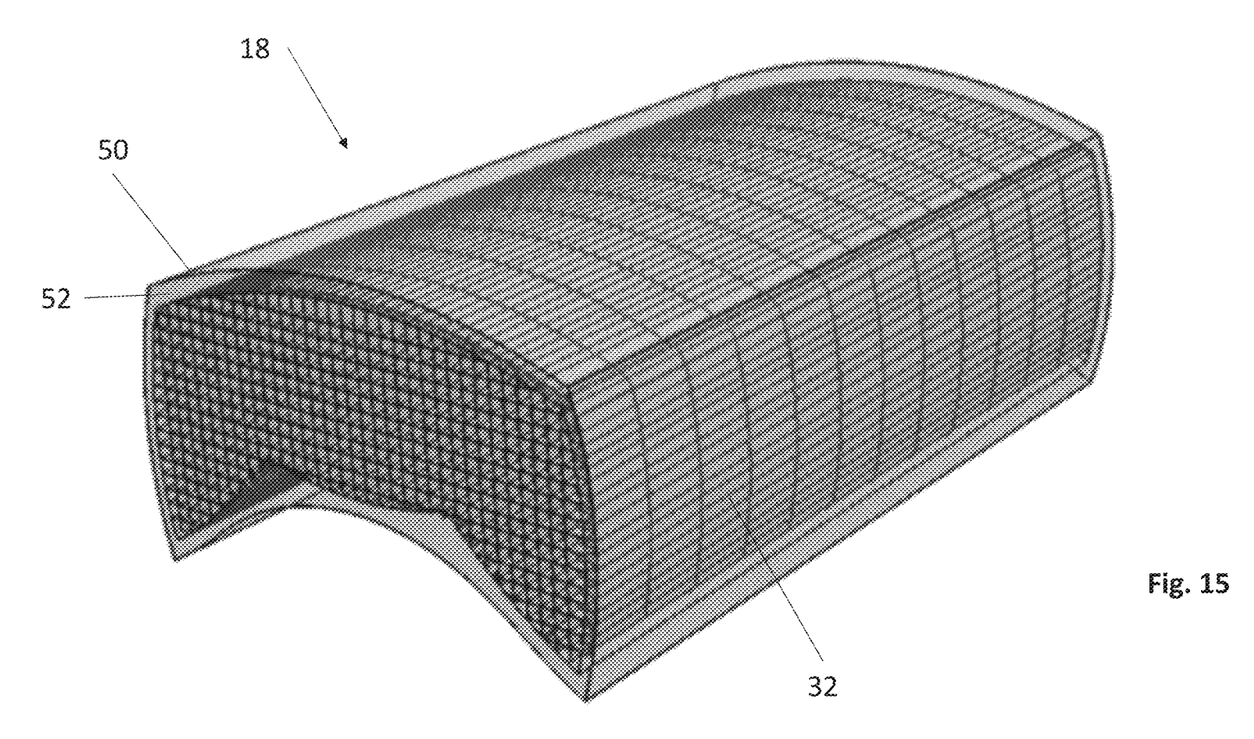
FIG. 15 shows a perspective view of the aircraft tank according to the first embodiment wherein additionally an outer skin thereof is shown.
Figure 16:
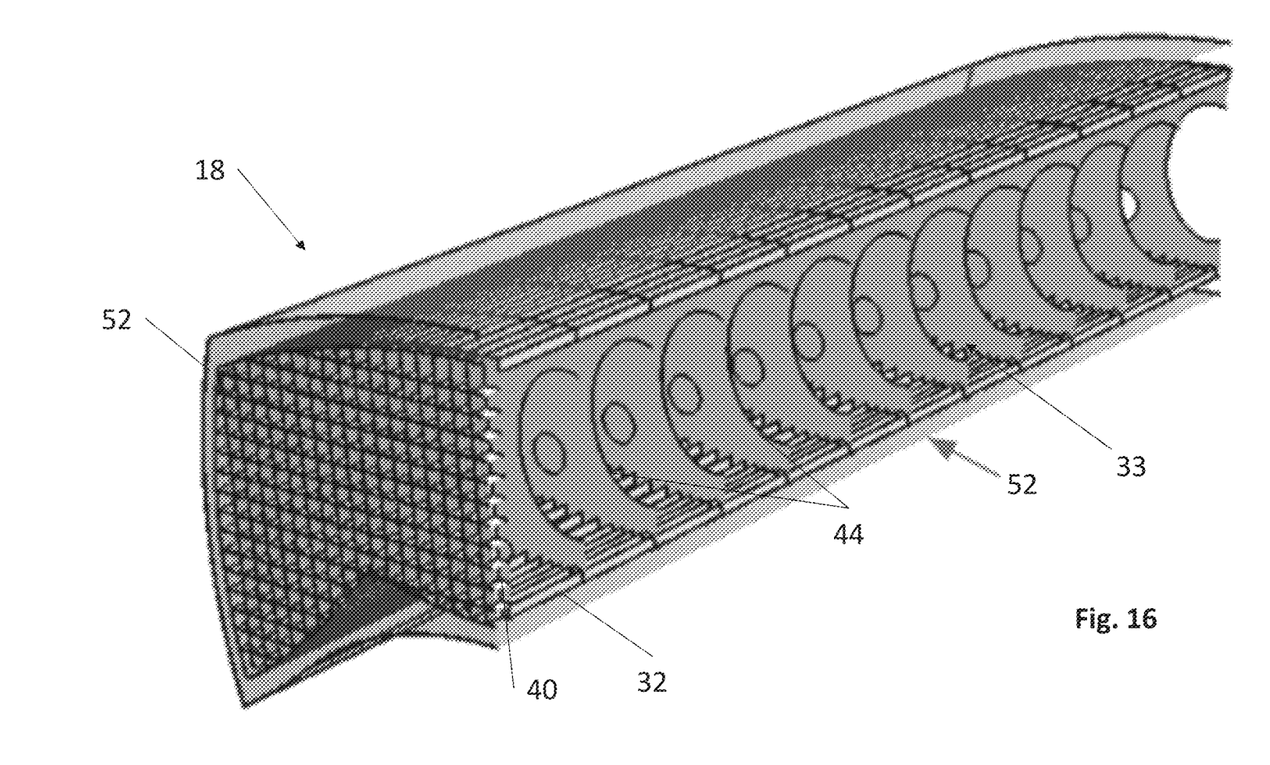
FIG. 16 shows the aircraft tank as in FIG. 15 wherein one half is cut away.

As shown in FIGS. 15 and 16, the aircraft tank 18 further comprises an outer skin 50. The outer skin 50 of the aircraft tank 18 has an aerodynamic function. The outer surface of the outer skin 50 is provided with aerodynamic smoothness, further, the outer skin 50 provides smooth transitions to the fuselage 10.

Between the outer skin 50 and the inner skin 32, an isolation chamber 52 is established. Hence, the outer skin 50 has the further function of tank isolation. The gap between the skins 32, 50 is selected such that a good isolation is possible. For example, the gap is at least 40 mm. The isolation chamber 52 is evacuated and/or contains isolation material as this is generally known for cryogenic $H_2$ tanks.

The aircraft tanks 18 according to the embodiments of the invention have been modelled in a finite element analysis to get a weight estimate and to estimate the stresses on the tank walls during use as liquid hydrogen tanks. The outcome was that the weight penalty of choosing a non-circular tank is compensated by the reduced fairing weight when compared with the first comparative example. Hence, surprisingly, the aircraft tanks 18 according to the embodiments of the invention provide overall a smaller weight compared to the comparative example with the cylindrical aircraft tank 18a. Further, the material stresses at the skins 32, 50 and the ribs 44 are much smaller as the allowable material stress.

As shown in FIGS. 1 and 3, the aircraft 12 is preferably a passenger aircraft wherein the fuselage 10 contains a passenger cabin 54 and a cargo space 56. Further embodiments using a similar fuselage 10 are configured as cargo aircrafts. Especially, the aircraft 12 is a narrow-body aircraft or a wide-body aircraft.

In order to enlarge a tank volume of a hydrogen powered aircraft (12), the invention proposes an aircraft tank (18) for storing cryogenic $H_2$ which is configured as a non-circular dorsal tank. Preferably, the aircraft tank (18) is configured as a conformal fuel tank fitted to an outer contour of an aircraft fuselage (10). Further, an aircraft 12 provided with such aircraft tank 18 has been described.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

REFERENCE SIGN LIST 10 fuselage
12 aircraft (embodiment of the invention)
12a aircraft (first comparative example—circular dorsal tank)
12b conventional aircraft (second comparative example)
14 turbofan
16 dorsal tank arrangement
16a dorsal tank arrangement
18 aircraft tank
18-1 forward aircraft tank
18-2 rear aircraft tank
18a cylindrical aircraft tank
20 fairing
22 unused space
24 lower side
26 recession
28-1 first skin segment
28-2 second skin segment
28-3 third skin segment
30 concave connection area
32 inner skin
33 tank volume
34-1 fourth skin segment
34-2 fifth skin segment
34-3 sixth skin segment
36 transition area
38 longitudinal stiffeners
40 bulkhead
42 orthogrid structure
44 rib
46 orifices ($H_2$ flow)
48 openings
50 outer skin
52 isolation chamber
54 passenger cabin
56 cargo space

The invention claimed is:

1. An aircraft comprising:
a cryogenic $H_2$ storage tank configured as a non-circular dorsal tank, the cryogenic $H_2$ storage tank comprising a plurality of plate-shaped ribs within an interior of the cryogenic $H_2$ storage tank to maintain an outer shape of the cryogenic $H_2$ storage tank and minimize deformation of the cryogenic $H_2$ storage tank,
wherein the cryogenic $H_2$ storage tank is configured as a conformal fuel tank fitted to an outer contour of an aircraft fuselage,
wherein the cryogenic $H_2$ storage tank has a lower side forming a lengthwise longitudinally-extending recess which receives a top of the fuselage therein.

2. The aircraft according to claim 1, wherein at least one of
at least one skin segment of the cryogenic $H_2$ storage tank has a cross section formed as a circular segment or elliptical segment;
first and second skin segments of the cryogenic $H_2$ storage tank are connected with a transition area having a stronger curvature compared to the curvature of the first and second skin segments; or
the lower side of the cryogenic $H_2$ storage tank is arranged such that the lower side faces the aircraft fuselage and has several skin segments connected by concave connection areas.

3. The aircraft according to claim 1, wherein the cryogenic $H_2$ storage tank has the lower side is arranged such that it faces an aircraft cabin and has first to third skin segments with a convex curvature with concave connection areas therebetween.

4. The aircraft according to claim 1, wherein the plurality of plate-shaped ribs comprises at least one of the following:
a series of reinforcement ribs connecting several skin segments of the cryogenic $H_2$ storage tank;
ribs with perforations enabling cryogenic $H_2$ flow;
ribs with several openings for weight reduction.

5. The aircraft according to claim 1, wherein the cryogenic $H_2$ storage tank comprises an inner skin side reinforced with at least one type of reinforcement structure coming from the group consisting of flanges, stringers, longitudinal stiffeners, orthogrid stiffeners, and isogrid stiffeners.

6. An aircraft comprising:
a cryogenic $H_2$ storage tank configured as a non-circular dorsal tank, the cryogenic $H_2$ storage tank comprising a plurality of plate-shaped ribs within an interior of the cryogenic $H_2$ storage tank to maintain an outer shape of the cryogenic $H_2$ storage tank and minimize deformation of the cryogenic $H_2$ storage tank,
wherein the cryogenic $H_2$ storage tank is configured as a conformal fuel tank fitted to an outer contour of an aircraft fuselage,
wherein the cryogenic $H_2$ storage tank further comprises at least one of the following:
a flat or plate-shaped bulkhead for closing at least one of a forward or backward end of the cryogenic $H_2$ storage tank;
a closure bulkhead with at least one reinforcement structure;
a closure bulkhead reinforced with at least one of the reinforcement structures of the group consisting of longitudinal stiffeners, transversal stiffeners, orthogrid stiffeners, and isogrid stiffeners; or
a bird-strike resistant forward closure bulkhead.

7. The aircraft according to claim 1, wherein the cryogenic $H_2$ storage tank comprises:
an inner skin defining an inner tank volume, and
a secondary outer skin enclosing the inner skin and defining an isolation chamber between the inner and outer skins.

8. The aircraft according to claim 7, wherein a distance between the inner and outer skins is at least 40 mm.

9. The aircraft according to claim 7, wherein the secondary outer skin has at least one of an aerodynamic smooth outer surface or a fairing function.

10. The aircraft according to claim 1, wherein the aircraft is a passenger or cargo aircraft.

11. The aircraft according to claim 10, wherein the aircraft is one of a narrow-body aircraft, a single-aisle aircraft, a wide-body aircraft, a double-aisle aircraft.

12. The aircraft according to claim 10, wherein the aircraft fuselage contains at least one of a passenger cabin or a cargo space, wherein the cryogenic $H_2$ storage tank is arranged on a top of the fuselage.

13. The aircraft according to claim 1, wherein the cryogenic $H_2$ storage tank comprises:

an inner skin defining an inner tank volume, and a secondary outer skin enclosing the inner skin and defining an isolation chamber between the inner and outer skins, and wherein the secondary outer skin of the cryogenic $H_2$ storage tank has aerodynamical smooth transitions to an outer skin of the aircraft fuselage.

\* \* \* \* \*